United States Patent
Sakaue

(10) Patent No.: US 7,260,730 B2
(45) Date of Patent: Aug. 21, 2007

(54) REMOTE POWER CONFIGURATION OF FUNCTIONS WITHIN MULTIFUNCTION APPARATUS USING STATUS AND SETTING SCREENS DISPLAYED ON EXTERNAL APPARATUS

(75) Inventor: Tsutomu Sakaue, Kanagawa (JP)

(73) Assignee: Canon Kabushiki Kaisha (JP)

( * ) Notice: Subject to any disclaimer, the term of this patent is extended or adjusted under 35 U.S.C. 154(b) by 391 days.

(21) Appl. No.: 10/689,533

(22) Filed: Oct. 20, 2003

(65) Prior Publication Data

US 2004/0139385 A1    Jul. 15, 2004

(30) Foreign Application Priority Data

Oct. 21, 2002  (JP)  .............................. 2002-306207

(51) Int. Cl.
*G06F 1/26*    (2006.01)
(52) U.S. Cl. .................... 713/310; 358/305; 709/220
(58) Field of Classification Search ............... 358/305; 709/220
See application file for complete search history.

(56) References Cited

U.S. PATENT DOCUMENTS

| | | | |
|---|---|---|---|
| 5,901,067 A * | 5/1999 | Kao et al. ...................... 700/11 |
| 6,507,273 B1 * | 1/2003 | Chang et al. ................. 340/3.1 |
| 6,785,023 B1 * | 8/2004 | Iida ............................. 358/442 |
| 7,099,934 B1 * | 8/2006 | Ewing et al. ............... 709/223 |
| 2002/0052940 A1 * | 5/2002 | Myers et al. ............... 709/223 |
| 2002/0178387 A1 * | 11/2002 | Theron ....................... 713/300 |

FOREIGN PATENT DOCUMENTS

| | | |
|---|---|---|
| JP | 06-183102 A | 7/1994 |
| JP | 08-204865 A1 | 8/1996 |

* cited by examiner

*Primary Examiner*—Chun Cao
*Assistant Examiner*—Albert Wang
(74) *Attorney, Agent, or Firm*—Rossi, Kimms & McDowell LLP

(57) ABSTRACT

There is provided an information processing apparatus that makes it possible to supply power only for a function desired by the user. A CPU causes a display unit to display a plurality of functions of the information processing apparatus in a manner being selectable. Information on at least one function selected from the plurality of functions via a screen displayed by the display unit is input. The CPU controls power supply relating to the input at least one function, based on the information on the at least one function.

10 Claims, 15 Drawing Sheets

FIG. 13

DEVICE NAME: MFP#01
LOCATION : SECOND FLOOR OF TOWER

LAST UPDATE: 2001/01/01 11:11:20

403 — DEVICE
606 — ▷ POWER OFF
▷ POWER ON
▷ SLEEP
▷ RELEASE SLEEP
▷ TIMER SETTING

JOB
BOX
ADDRESS
SPECIFICATION SETTING

1503 ○  1504 [11 HOUR ▼]  1505 [15 MINUTES ▼] START

1506 ○  1507 [00 HOUR ▼]  1508 [00 MINUTES ▼] LATER START

1509 [EXECUTE]   1510 [CANCEL]

FIG. 14

DEVICE NAME: MFP#01
LOCATION : SECOND FLOOR OF TOWER

LAST UPDATE: 2001/01/01 11:11:30

403 — DEVICE
606 — ▷ POWER OFF
▷ POWER ON
▷ SLEEP
▷ RELEASE SLEEP
▷ TIMER SETTING

JOB
BOX
ADDRESS
SPECIFICATION SETTING

○ [11 HOUR ▼]  [15 MINUTES ▼] START

○ [00 HOUR ▼]  1507  1508
[10 MINUTES ▲
15 MINUTES
20 MINUTES
25 MINUTES
30 MINUTES
35 MINUTES ▼] LATER START

[EXECUTE]

REMOTE POWER CONFIGURATION OF FUNCTIONS WITHIN MULTIFUNCTION APPARATUS USING STATUS AND SETTING SCREENS DISPLAYED ON EXTERNAL APPARATUS

BACKGROUND OF THE INVENTION

1. Field of the Invention

The present invention relates to an information processing apparatus, a power supply control method for the same, and a power supply control program.

2. Description of the Related Art

Conventionally, a power supply control technique for an image forming apparatus has been known in which the power status of the image forming apparatus is monitored at a remote location, and the turning-on/off of power supply to the image forming apparatus is remotely controlled.

Also, a power supply control technique has been known in which the turning-on/off of power supply only to a designated local part of an image forming apparatus (refer to Japanese Laid-Open Patent Publication (Kokai) No. 6-183102, for example).

On the other hand, a so-called multifunction digital copying machine has been known as an image forming apparatus for inputting/outputting images. The multifunction digital copying machine is comprised mainly of a scanner which reads an original image recorded on e.g. a sheet, a printer which outputs the read image or an image transmitted from a host computer to a medium such as a sheet, a device controller which controls the operations of the scanner and the printer or performs various kinds of image processing, an operating section through which the user can operate the machine, and a memory and a hard disk which temporarily or permanently store image data, processing programs, and so forth.

The multifunction digital copying machine constructed as described above is capable of not only copying an original image but also transferring image data read by the scanner to the host computer via a LAN (network) and, on the other hand, causing the printer to print out documents prepared on the host computer using a word processor or the like. Further, as is known, the multifunction digital copying machine has a variety of functions such as a facsimile function of transmitting an original image to a facsimile apparatus at a remote location.

According to the conventional techniques, however, although instructions for turning-on/off power supply to the image forming apparatus can be given from a remote location, such instructions are only related to turning-on/off of power supply to the image forming apparatus as a whole, and hence power supply cannot be controlled in a manner satisfying user's needs.

For example, the multifunction digital copying machine has the problem that even when it is desired to use only a printing function, power is supplied for not only the printing function but also the facsimile function in response to an instruction for turning on power supply.

Further, when power supply for the printing function is desired to be turned off, power supply for not only the printing function but also the facsimile function is turned off, and hence it is necessary to turn on power supply again when using the facsimile function.

Further, due to complicated functions of the multifunction digital copying machine, the user is required to carry out such a complicated operation as designating as to which part is to be subjected to power supply control to carry out turning on/off of power supply in a manner satisfying his/her needs.

SUMMARY OF THE INVENTION

It is an object of the present invention to provide an information processing apparatus, a power supply control method for the same and a power supply control program that make it possible to supply power only for functions desired by the user.

To attain the above object, in a first aspect of the present invention, there is provided an information processing apparatus having a plurality of functions, comprising a display unit, a display control unit that causes the display unit to display the plurality of functions in a manner being selectable, an input unit that inputs information on at least one function selected from the plurality of functions via a screen displayed by the display unit, and a power supply control unit that controls power supply relating to the at least one function input via the input unit, based on the information on the at least one function.

According to the first aspect of the present invention, the user can carry out control of power supply only for his/her desired function without hesitation, and does not have to carry out such complicated operations as determining a device or devices which correspond to his/her desired function and bringing the device or devices into an ON/OFF/sleep state.

Preferably, the display control unit controls the display unit to display types of power supply control corresponding to the at least one function on the screen in a manner being selectable, and the power supply control unit controls the power supply based on the information on the at least one function input via the input unit and information on the types of power supply control corresponding to the at least one function.

Preferably, the information processing apparatus comprises a plurality of units relating to execution of the plurality of functions, and wherein the power supply control unit controls power supply to at least one unit of the plurality of units which is required for execution of the at least one function input via the input unit.

Preferably, the display control unit controls the display unit to display a change in status of power supply corresponding to the at least one function on the screen.

Preferably, the information processing apparatus comprises a communication control unit that carries out communication with an external unit via a network.

With this preferable arrangement, it is possible to control power supply and indicate the status thereof for each function via a network and more particularly on the Web.

Preferably, the information processing apparatus is implemented by an image processing apparatus having image forming unit for forming an image.

Preferably, the plurality of functions comprise at least two functions selected from the group consisting of a printing function, a facsimile function, a copying function, and a scanner function.

To attain the above object, in a second aspect of the present invention, there is provided a power supply control method for an information processing apparatus including a display unit and having a plurality of functions, comprising a display control step of causing the display unit to display the plurality of functions in a manner being selectable, an input step of inputting information on at least one function selected from the plurality of functions via a screen displayed by the display unit, and a power supply control step of controlling power supply relating to the at least one function input in the input step, based on the information on the at least one function.

Preferably, the display control step comprises controlling the display unit to display types of power supply control corresponding to the at least one function on the screen in a manner being selectable, and the power supply control step comprises controlling the power supply based on the information on the at least one function input in the input step and information on the types of power supply control corresponding to the at least one function.

Preferably, the information processing apparatus comprises a plurality of units relating to execution of the plurality of functions, and the power supply control step comprises controlling power supply to at least one unit of the plurality of units which is required for execution of the at least one function input in the input step.

Preferably, the display control step comprises controlling the display unit to display a change in status of power supply corresponding to the at least one function on the screen.

Preferably, the power supply control method comprises a communication control step of carrying out communication with an external unit via a network.

Preferably, the information processing apparatus is implemented by an image processing apparatus having image forming unit for forming an image.

Preferably, the plurality of functions comprise at least two functions selected from the group consisting of a printing function, a facsimile function, a copying function, and a scanner function.

To attain the above object, in a third aspect of the present invention, there is provided a power supply control program for causing a computer to execute a power supply control method for an information processing apparatus including a display unit and having a plurality of functions, comprising a display control module for causing the display unit to display the plurality of functions in a manner being selectable, an input module for inputting information on at least one function selected from the plurality of functions via a screen displayed by the display unit, and a power supply control module for controlling relating to the at least one function input by the input module, based on the information on the at least one function.

The above and other objects, features, and advantages of the invention will become more apparent from the following detailed description taken in conjunction with the accompanying drawings.

BRIEF DESCRIPTION OF THE DRAWINGS

FIG. 13 is a view showing a window screen displayed when a timer setting button 606 is selected;

FIG. 14 is a view showing a window screen for setting time by a minute setting section 1508;

FIG. 22 is a view showing a window screen displayed when power supply for the printing function is turned on;

FIG. 24 is a view showing a window screen displayed when the power supply for the copying function is turned on.

DETAILED DESCRIPTION OF THE PREFERRED EMBODIMENTS

Figure 1:
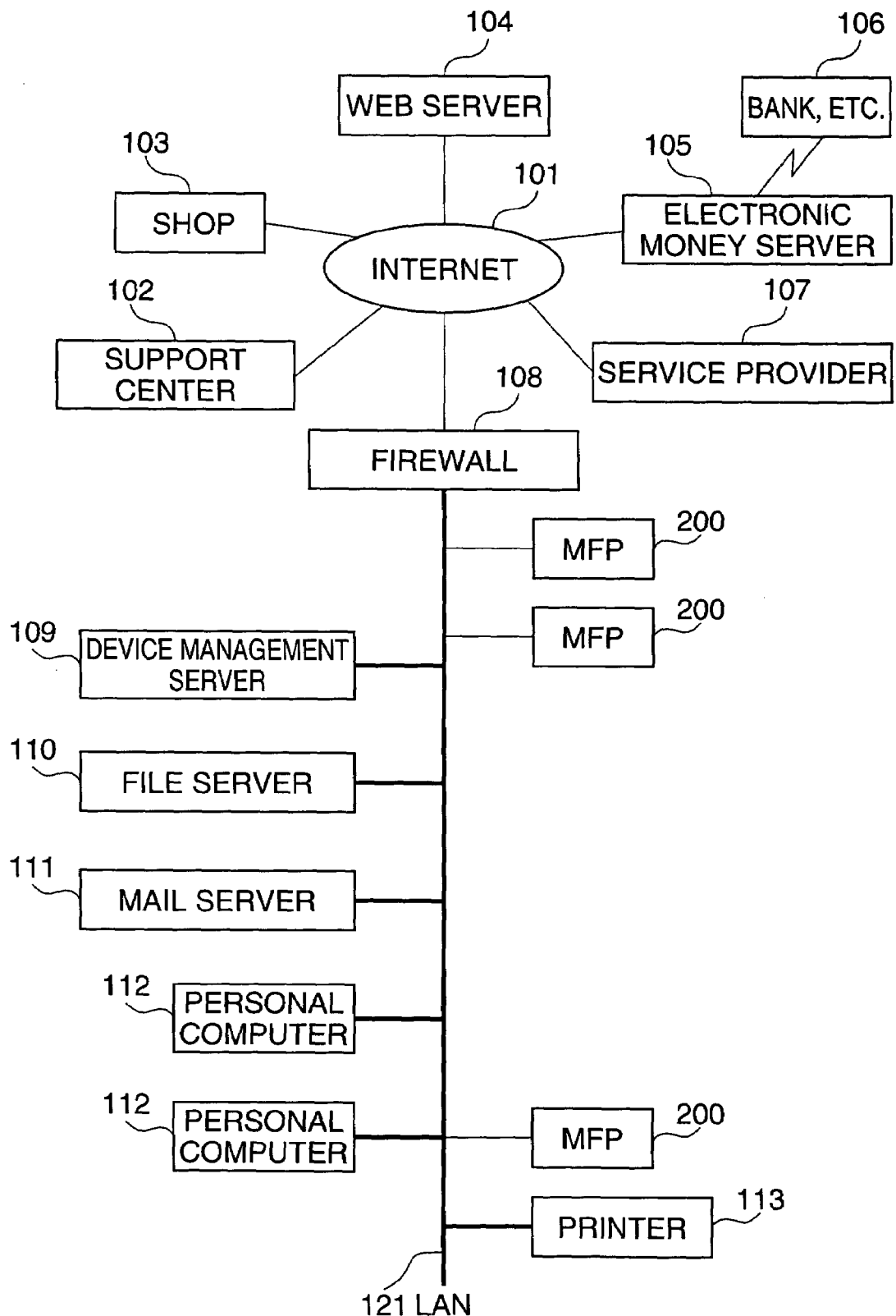
FIG. 1 is a diagram showing the arrangement of a remote control system incorporating an information processing apparatus according to a first embodiment of the present invention.

The present invention will now be described in detail with reference to the drawings showing preferred embodiments thereof. In the drawings, elements and parts which are identical throughout the views are designated by identical reference numerals, and duplicate description thereof is omitted.

FIG. 1 is a diagram showing the arrangement of a remote control system incorporating an information processing apparatus according to a first embodiment of the present invention. In FIG. 1, reference numeral 101 denotes a communication network such as the Internet; 102, a support center for providing support for hardware and software; 103, a hardware/software shop; 104, a Web server that is connected to the Internet to provide specific services for Internet users; 105, an electronic money server that deals with e.g. settlement between a banking institution 106 and clients (terminal apparatuses); and 107, a service provider that connects personal user's terminal apparatuses and the Internet 101 to each other.

It should be noted that clients as terminal apparatuses are implemented by personal computers 112, and are each comprised of a CPU (Central Processing Unit), non-volatile storage such as a RAM and a hard disk, an input/output section for inputting/outputting information to and from a variety of peripheral devices such as a display, a keyboard, and a mouse, and a communication section such as a modem, all of which are provided in an ordinary information processing apparatus. The personal computers 112 constructed as above perform processing according to flow charts described later and control the display of screens.

Reference numeral 108 denotes a firewall that connects the Internet 101 as an external communication network to a LAN 121, and carries out security management, for example. Reference numeral 109 denotes a device management server that manages a file server 110, a mail server 111, the personal computers (PCs) 112, a printer 113, and so forth connected to the LAN (network) 121, and manages users and data such as accounting information. The file server 110 carries out data management, for example, and outputs data to a multifunction digital copying machine 200 or the printer 113 as the need arises.

Figure 2:
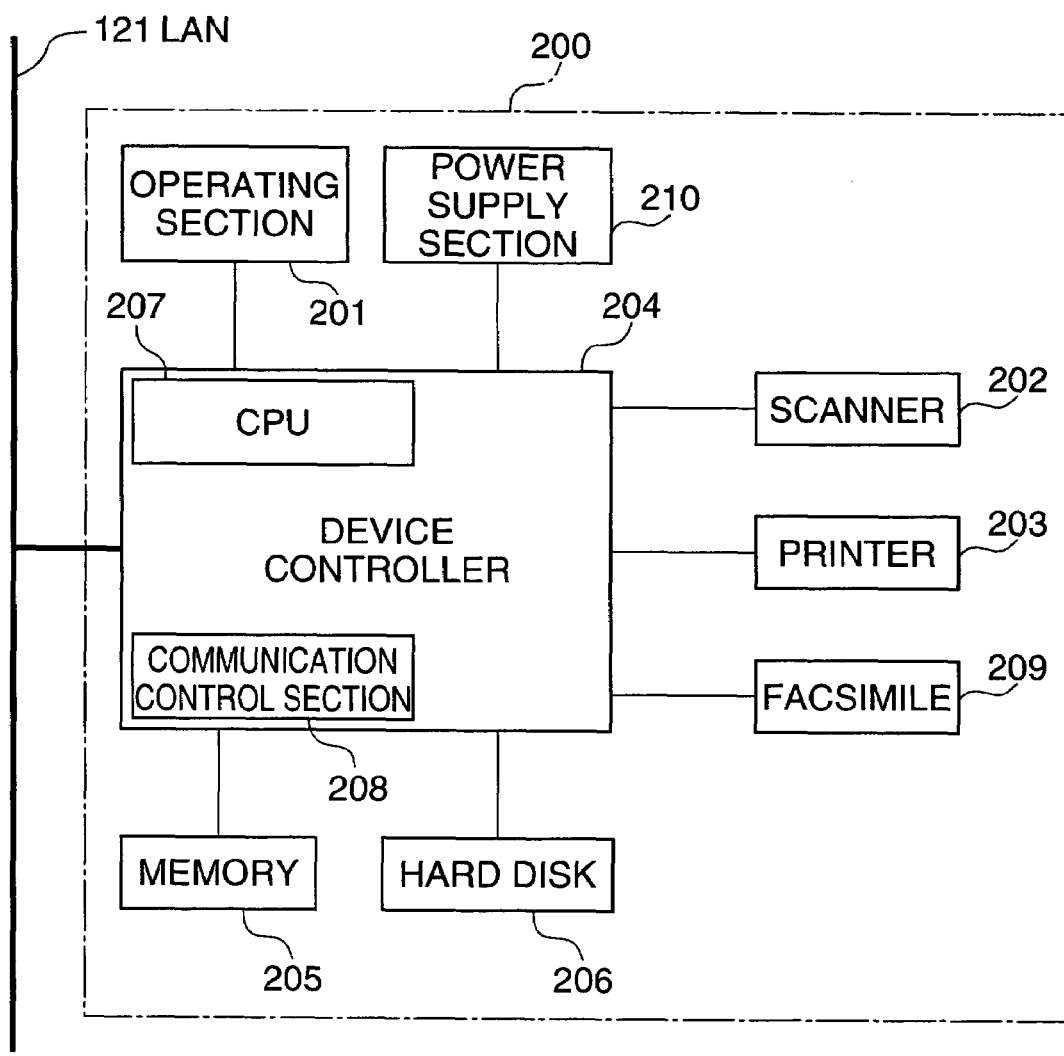
FIG. 2 is a block diagram showing the arrangement of a multifunction digital copying machine (MFP) 200 appearing in FIG. 1.

FIG. 2 is a block diagram showing the arrangement of the multifunction digital copying machine 200 as the information processing apparatus. The multifunction digital copying machine 200 (hereinafter referred to as "the MFP") 200 is comprised mainly of a scanner 202 which reads an original image recorded on e.g. a sheet, a printer 203 which outputs the read image or an image received via the LAN 121 to a medium such as a sheet, a facsimile 209 which transmits an image to an external terminal apparatus, a device controller 204 which controls the operations of the scanner 202, printer 203, and facsimile 209 or performs various kinds of image processing, an operating section 201 for inputting instructions for operations of the devices, and a memory 205 and a hard disk 206 which temporarily or permanently store image data and processing programs. The device controller 204 is comprised of a CPU 207 which executes programs stored in the memory 205 and the hard disk 206, and a communication control section 208 which controls communication between the devices 201 to 206 and 209, the LAN 121, and the CPU 207. Further, the MFP 200 includes a power supply section 210 which is connected to the device controller 204 and supplies power to the devices 201 to 209. Since the Internet is now widely used, the MFP 200 is connected not only to a specific network (LAN) but also to other networks around the world via the firewall 108. Namely, the MFP 200 can be managed and controlled not only via a specific network but also from terminal apparatuses and others connected to networks around the world. In the MFP 200, a copying function is realized by a combination of the scanner 202 and the printer 203.

Figure 3:
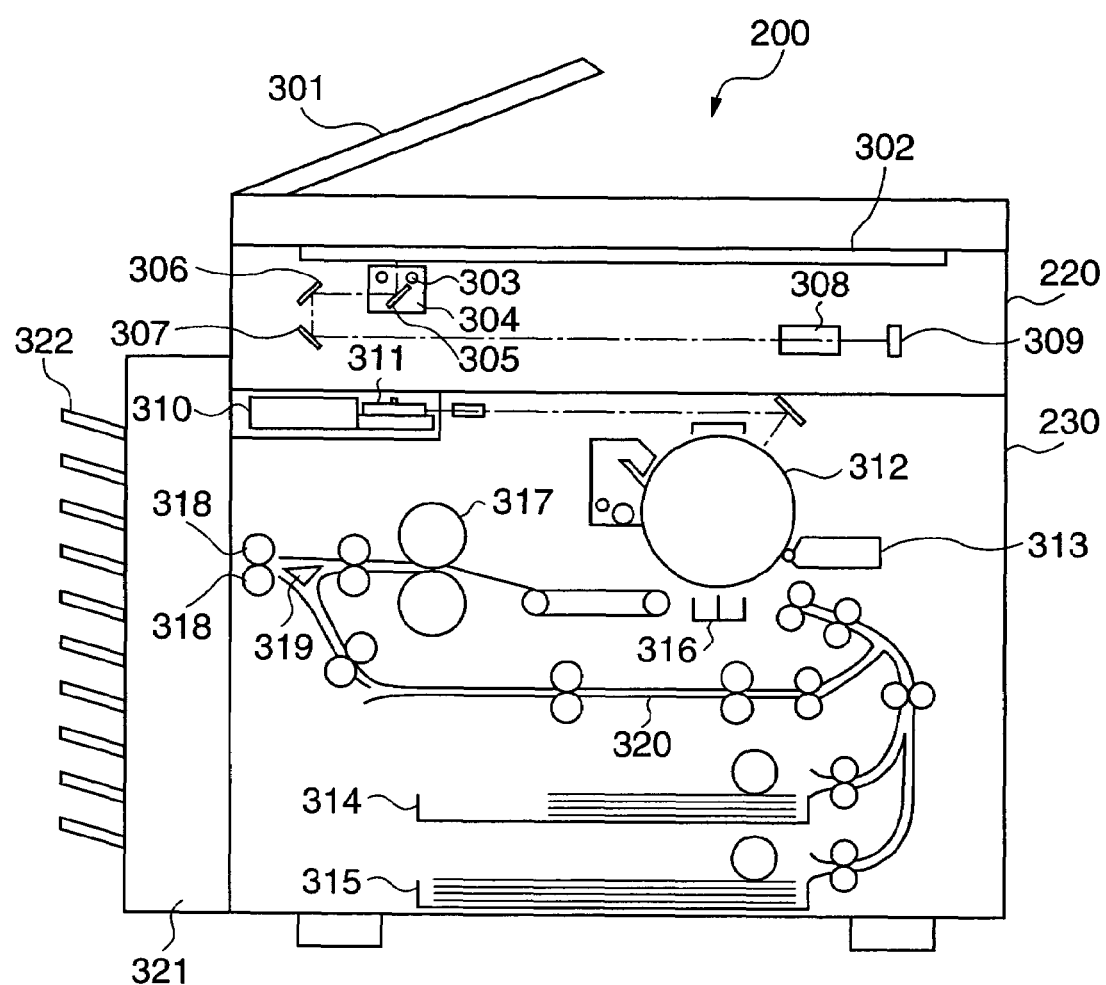
FIG. 3 is a sectional view showing the construction of the MFP 200.

FIG. 3 is a sectional view showing the construction of the MFP 200. The MFP 200 is comprised of a reader section 220 and a printer section 230. In the reader section 220, an original feeder 301 sequentially feeds originals sheet by sheet from the last page onto a platen glass 302, and discharges each original on the platen glass 302 after the original is read. When each original is conveyed onto the platen glass 302, a lamp 303 is turned on, and a scanner unit 304 is caused to start moving to scan the original back and forth.

On this occasion, light reflected from the original is guided to a CCD image sensor (hereinafter referred to as "the CCD") 309 by optical elements such as mirrors 305, 306, and 307 and a lens 308. An image on the original thus scanned is read by the CCD 309. The CCD 309 outputs image data, which is then subjected to predetermined processing and transferred to the printer section 230.

A laser driver 310 of the printer section 230 drives a laser emitter 311 to emit laser light corresponding to the image data output from the reader section 220. The laser light is irradiated upon a photosensitive drum 312, so that a latent image corresponding to the laser light is formed on the photosensitive drum 312. A developing agent is attached to the latent image on the photosensitive drum 312 by a developing unit 313. Then, in timing synchronous with the start of laser light irradiation, a recording sheet is fed from a cassette 314 or 315 and conveyed to a transfer section 316, and the developing agent attached to the photosensitive drum 312 is transferred onto the recording sheet.

The recording sheet with the developing agent attached thereto is conveyed to a fixing section 317, so that the developing agent is fixed on the recording sheet due to heat and pressure applied by the fixing section 317. After passing through the fixing section 317, the recording sheet is discharged by a pair of discharging rollers 318. In the case where a sorting mode is not set, a sorter 321 stores the recording sheet on a top pin 322. On the other hand, in the case where a double-sided recording mode is set, the recording sheet is conveyed to the discharging rollers 318, and then the rotational directions of the discharging rollers 318 are reversed, so that the recording sheet is guided to a sheet refeed conveying path 320 by a flapper 319. In the case where a multiple recording mode is set, the recording sheet is guided to the sheet refeed conveying path 320 by the flapper 319, while the recording sheet is not conveyed to the discharging rollers 318. The recording sheet conveyed to the sheet refeed conveying path 320 is fed to the transfer section 316 in the above described timing.

The MFP 200 constructed as described above is operated by the user through the operating section 201, and the scanner 202 of the MFP 200 receives images in accordance with instructions given from the operating section 201 and the personal computers 112. The printer 113 prints data received from the personal computers 112 and the file server 110.

The device controller 204 controls the input/output of image data to/from the scanner 202, printer 203, memory 205, hard disk 206, or personal computer 112 in accordance with instructions input from the operating section 201 or the personal computer 112. For example, the device controller 204 provides control to store image data, which is captured from the scanner 202, in the memory 205 or the hard disk 206 as the need arises, output the data to the personal computer 112, or cause the printer 203 to print the data.

The printer 113 prints image data, which is supplied from the personal computer 112 or the file server 110, on a recording sheet. The personal computer 112 as a terminal apparatus is connected to the LAN 121, and refers to information supplied from the Web server 104 via the Internet 101, and outputs image data to the MFP 200 and the printer 113. It should be noted that the personal computer 112 is connected to the Internet 101 via the firewall 108, but may be connected to the Internet 101 via the service provider 107.

To remotely control the MFP 200 via a network in the above described environment, it can be envisaged that a special line or a telephone line is used, but in the present embodiment, the Internet is used. As described above, the MFP 200 is connected to the LAN 121 and has an IP (Internet Protocol) address. The MFP 200 is used as a web server to execute a script language or the like so that the device management server 109 and the personal computers 112 can access the MFP 200 using a web browsing tool. Here, examples of the script language include JavaScript (registered trademark) developed by Sun Microsystems, Inc. Examples of the Web browsing tool include Internet Explorer (registered trademark) developed by Microsoft Corporation and Netscape Navigator (registered trademark) developed by Netscape Communications Corporation.

By using the Web browsing tool, the MFP 200 can be remotely controlled without depending on a platform. For example, the MFP can be controlled from terminal apparatuses whichever of Windows (registered trademark) developed by Microsoft Corporation, Mac OS (registered trademark) developed by Apple Computer Inc., and Unix (registered trademark) the terminal apparatuses operate on. Specifically, by thus enabling remote control of the MFP 200 irrespective of the platform, the MFP 200 can be set or reset on a browsing screen, described later, not only from the specific device management server 109 but also from all the computers (terminals) on the LAN 121.

In the following description, it is assumed that the MFP is based on the electrophotographic process, but it goes without saying that the information processing apparatus according to the present invention may be applied to an MFP having an image forming section based on the ink-jet printing process, an electrophotographic printer having a plurality of predetermined functions, a facsimile machine, a copying machine, or the like, for example.

Further, the information processing apparatus according to the present invention may be also applied to a single function machine that has any of a printer function, a facsimile function, and a copy function and is connected to a network such that it may communicate with the network. In this case, each of devices constituting an MFP and corresponding to each function, described later, corresponds to the apparatus having each function.

Figure 4:
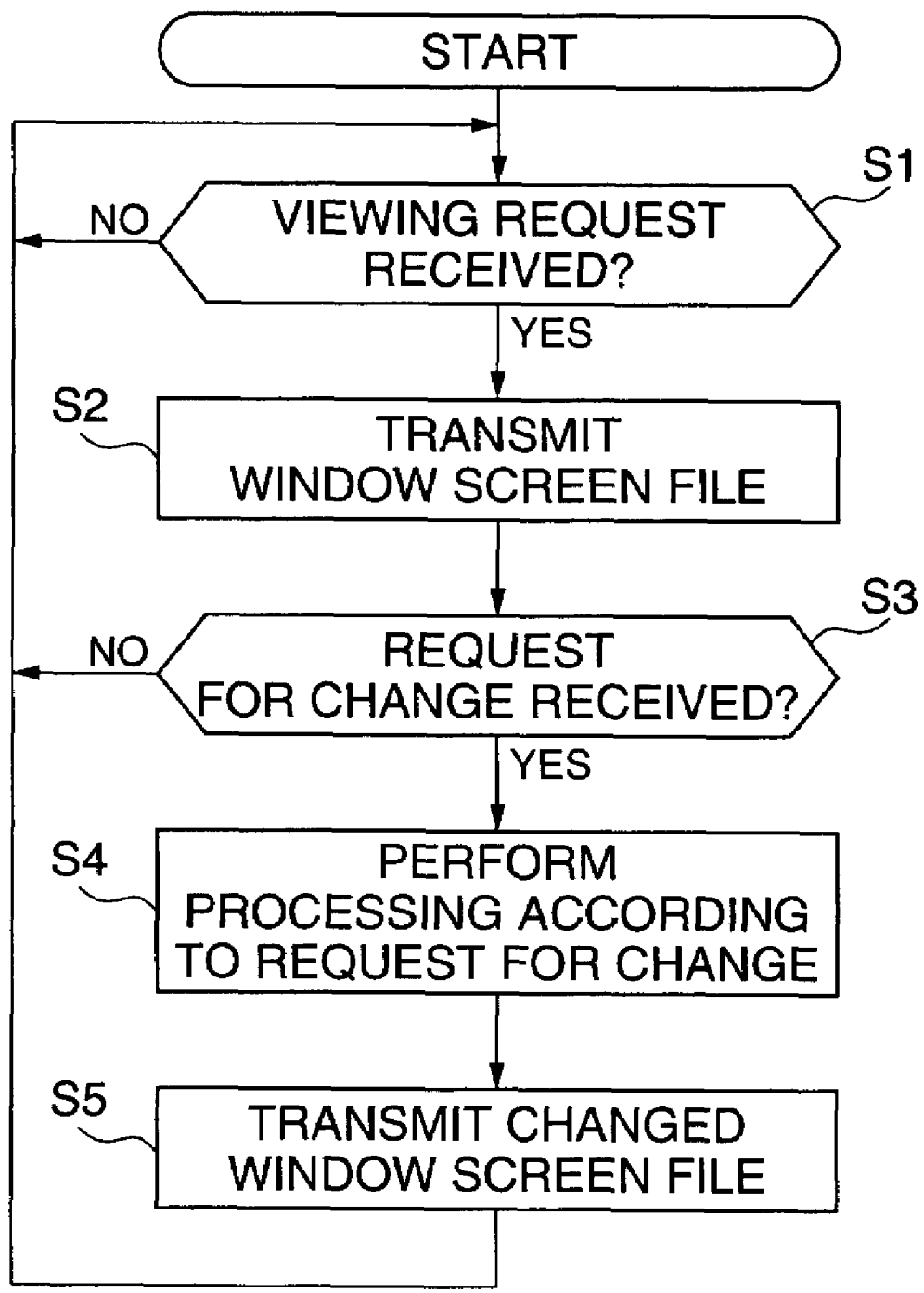
FIG. 4 is a flow chart showing the procedure of a power supply control process carried out by the MFP 200 as a Web server.

FIG. 4 is a flow chart showing the procedure of a power supply control process carried out by one of the MFPs 200 serving as a Web server. A program for carrying out this process is stored in the hard disk 206 of the MFP 200 and is read out and executed by the CPU 207 of the device controller 204 via the communication control section 208. It should be noted that the communication control section 208 included in the device controller 204 has a function of sending and receiving markup languages such as HTML and XML conforming to Hyper Text Transfer Protocol. In the following description, it is assumed that HTML is used, but it goes without saying that a variety of markup languages such as XML may be used.

First, a request to view a window screen is awaited, which is made by any terminal apparatus such as the PC 112 connected to the LAN 121 (step S1). In response to the request, the power statuses of the respective devices (respective blocks in FIG. 2) in the MFP 200 are detected, and information on a window screen file in HTML is generated based on the detected power statuses, and the window screen file is transmitted to the terminal apparatus having made the request (step S2). It should be noted that in the step S2, the power statuses can be detected each time a viewing request is made by a terminal apparatus, or information indicative of the detected power statues is stored in the memory 205 or the hard disk 206 in predetermined timing so that the CPU 207 can read out the stored information in response to a viewing request from a terminal apparatus. Here, the power statuses may be detected based on values detected by predetermined sensors, not shown, or may be detected by checking a history of power supply control commands stored in the memory 205 or the hard disk 206 by the CPU 207 when the CPU 207 gives power supply control commands to the respective devices.

Figure 16:
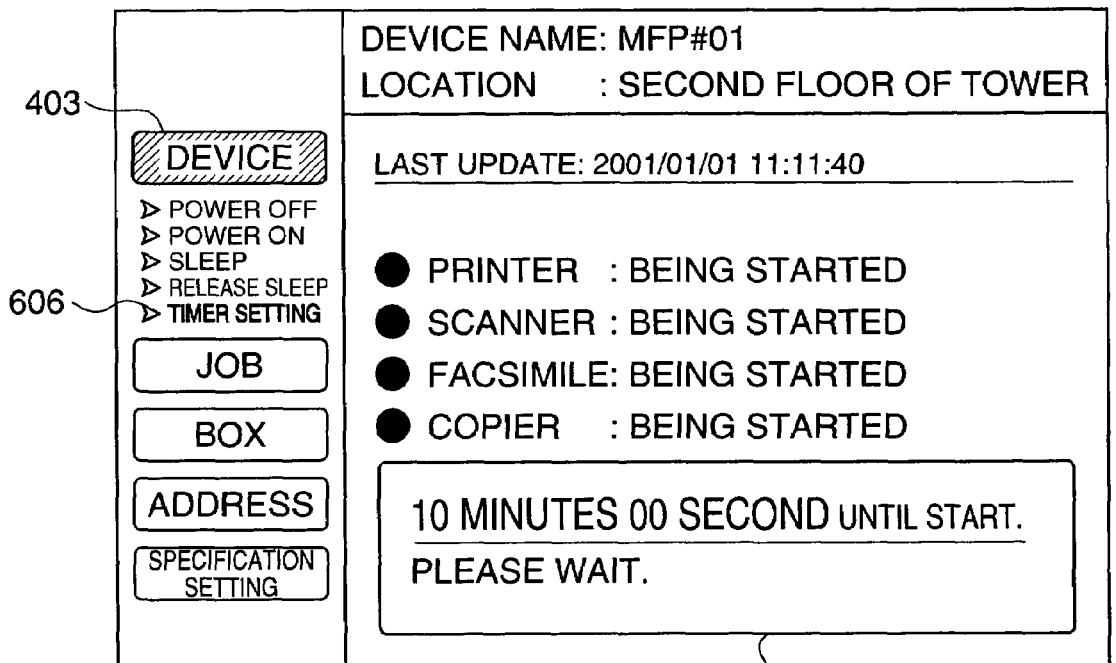
FIG. 16 is a view showing a window screen displayed when an execution button 1509 is depressed.

Then, it is determined whether or not a request for change on a window screen (for example, a request to turn on power supply as shown in FIG. 16) has been made by the terminal apparatus (client) or not (step S3). If the request for change has not been made, the process returns to the step S1. It should be noted that in the present embodiment, the window screen means a setting screen for making various settings including at least an instruction for controlling power supply to the MFP 200.

Figure 8:
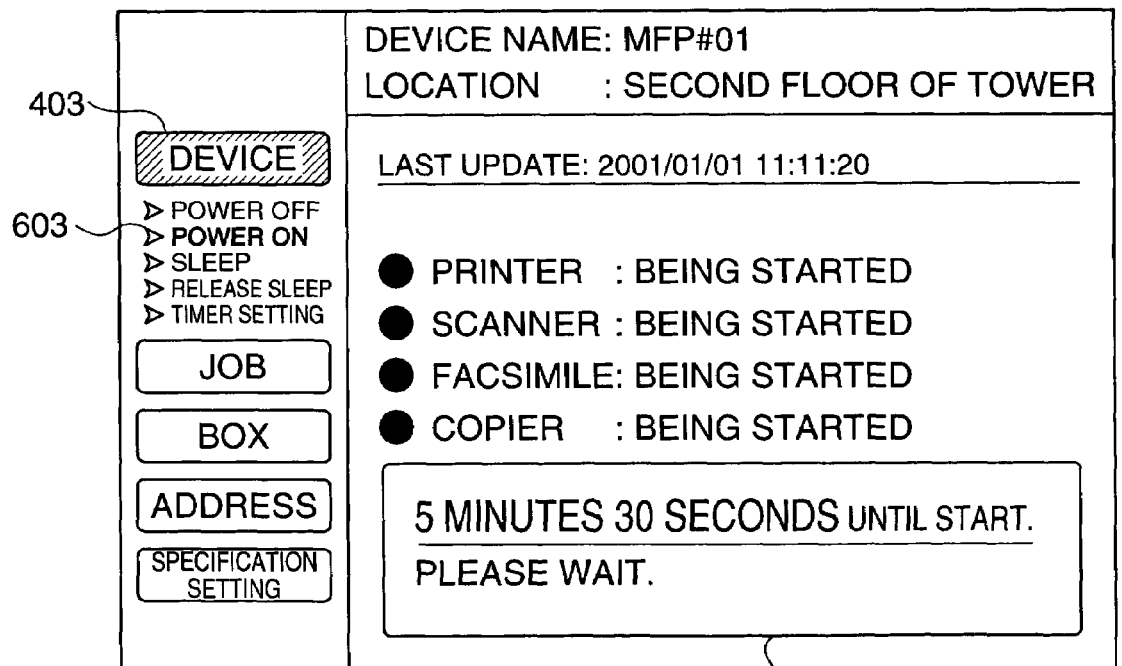
FIG. 8 is a view showing a window screen when a power-on button 603 is selected.

On the other hand, if the request for change has been made, processing is performed in accordance with the request (step S4). For example, as shown in FIG. 8, devices of the MFP 200 are started, and a status display section 704 is caused to indicate that the respective devices are being started. Then, the window screen file is changed, and the changed file is then transmitted to the terminal apparatus (step S5). The process then returns to the step S1.

Figure 5:
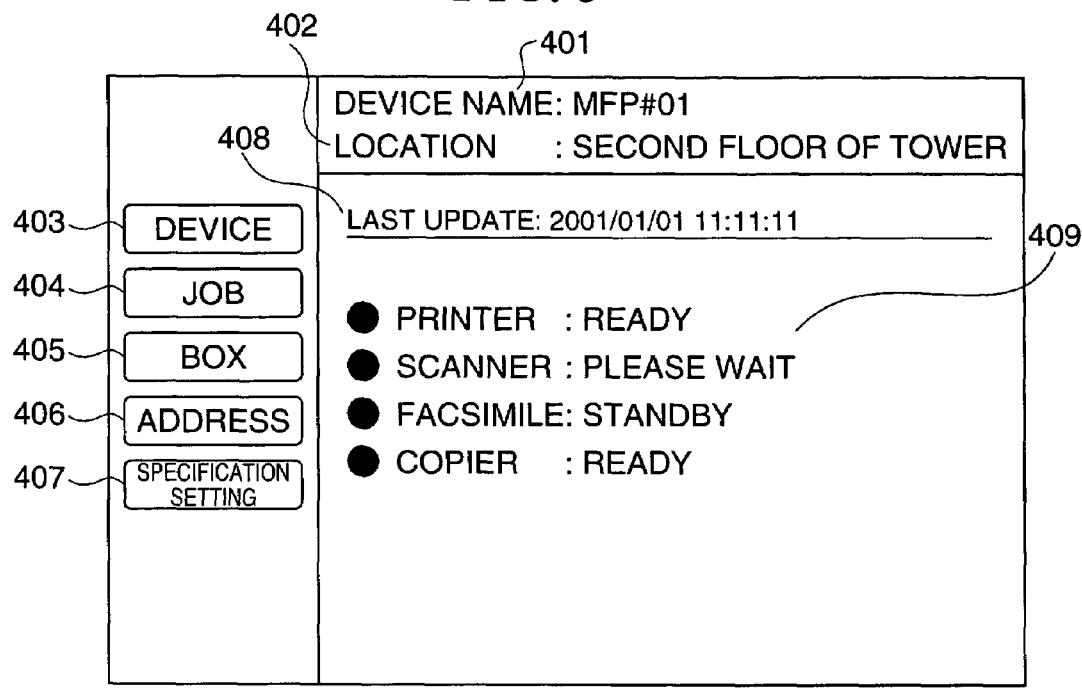
FIG. 5 is a view showing a window screen for controlling power supply.

A description will now be given of how the turning-on/off of power supply is controlled via a network. FIG. 5 is a view showing a window screen for controlling power supply. The MFP 200 connected to the LAN 121 can be controlled through the operation of this screen. Window screens shown in FIGS. 5 to 24 are described in HTML (Hyper Text Markup Language), for example.

Further, HTML information for displaying any of screens shown in FIGS. 5 to 24 on the display of a terminal apparatus via a browser is stored in advance in the memory 205 or the hard disk 206 of the MFP 200, or is generated by the MFP 200 in response to each request from a terminal apparatus. At a terminal apparatus having made a request, an appropriate one of the screens shown in FIGS. 5 to 24 is displayed in accordance with the HTML information received from the MFP 200.

On the window screen in FIG. 5, for example, a name 401 and a location 402 of a device to be controlled are displayed. Further, a variety of buttons 403 to 407 are provided to enable function setting and job management. The device button 403 is used for checking the operative status of the device and controlling the device. The job button 404 is used for viewing a history of print jobs, copy jobs, or facsimile jobs. The box button 405 is used for viewing and managing user's data stored in the hard disk 206 of the MFP 200. As the need arises, the user prints the data or transmits the data by facsimile, or transmits the data to another MFP, computer, or the like. The address button 406 is used for transmitting the scanned image, and setting/registering e.g. a destination of the scanned image to be transmitted by facsimile. The specification setting button 407 is used for making basic setting, network setting, sending/receiving setting, etc. of the MFP.

On a main window, a last update time 408 and a device operative status 409 are usually displayed. During normal operation, the operative statuses of the printer, scanner, facsimile, and copier are displayed as shown in FIG. 5. In this way, the operative status of the MFP 200 can be checked on the Web even at a remote location.

Figure 6:
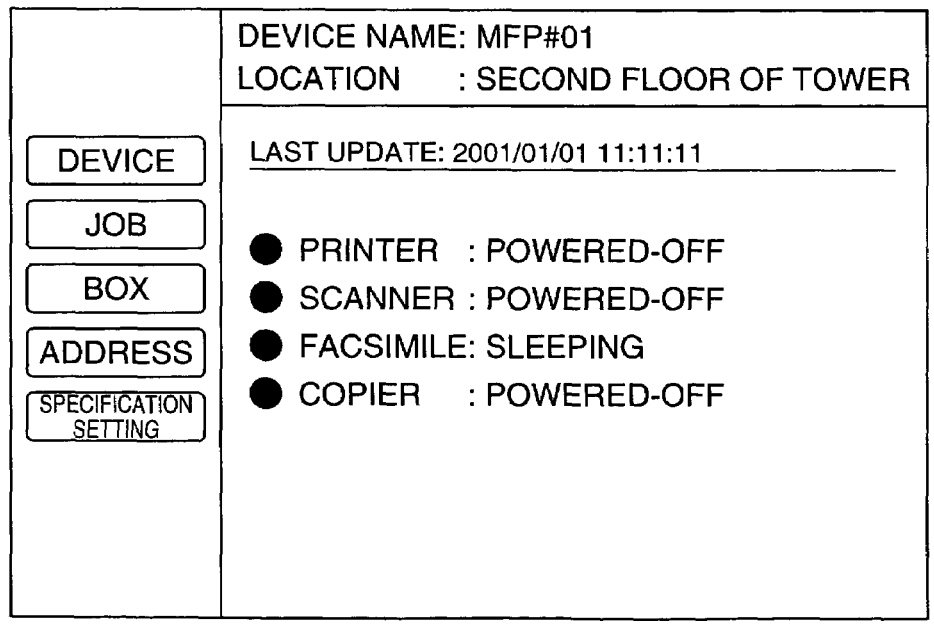
FIG. 6 is a view showing a window screen of the MFP 200 for which power supply has been turned off.

FIG. 6 is a view showing a window screen of the MFP 200 when power supply is off. The status of the powered-off MFP 200 can be viewed on the Web. In FIG. 6, the facsimile function (facsimile 209) is in the sleep state and ready to receive data, but the other devices are off. In this state, the MFP 200 is powered on in accordance with an instruction from a terminal apparatus on the Web so that the MFP can be used.

Figure 7:
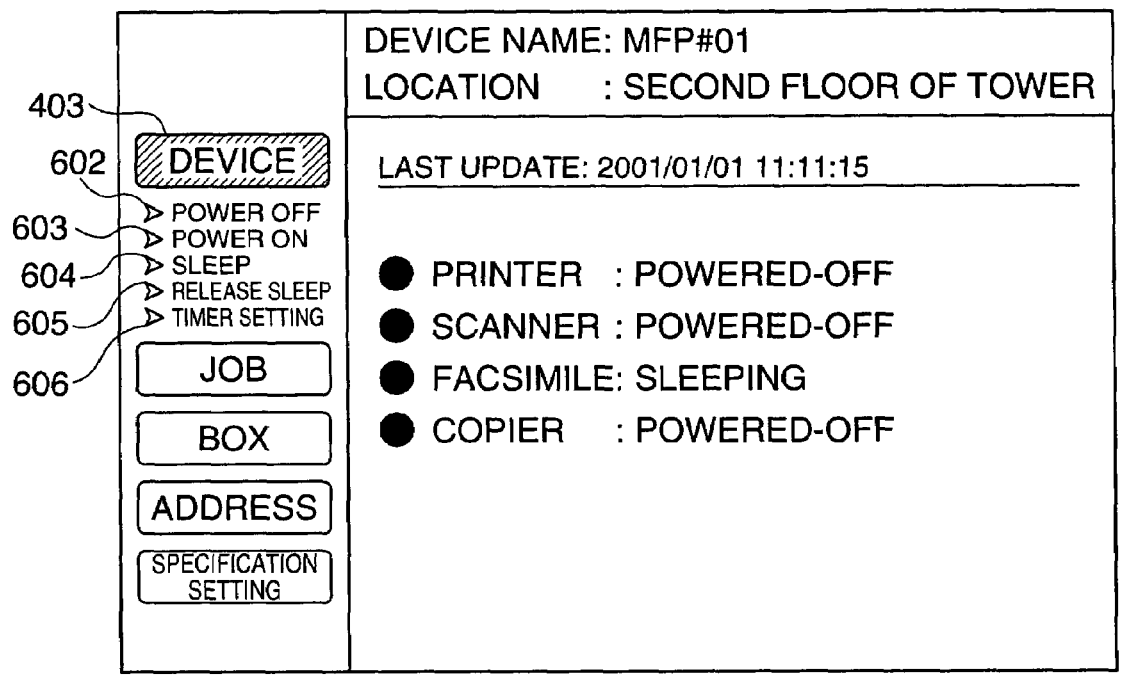
FIG. 7 is a view showing a window screen displayed when a device button 403 is selected.

FIG. 7 is a view showing a window screen displayed when the device button 403 is selected. When the device button 403 is selected, it is highlighted, and a variety of device settings are displayed. Specifically, a power-off button 602, a power-on button 603, a sleep button 604, a sleep release button 605, and a timer setting button 606 are displayed. Although in the present embodiment, the turning-on/off of power supply and the setting/release of the sleep state are indicated as the device settings, the present invention is not limited to this. To start the powered-off MFP 200, the power-on button 603 is selected.

Figure 9:
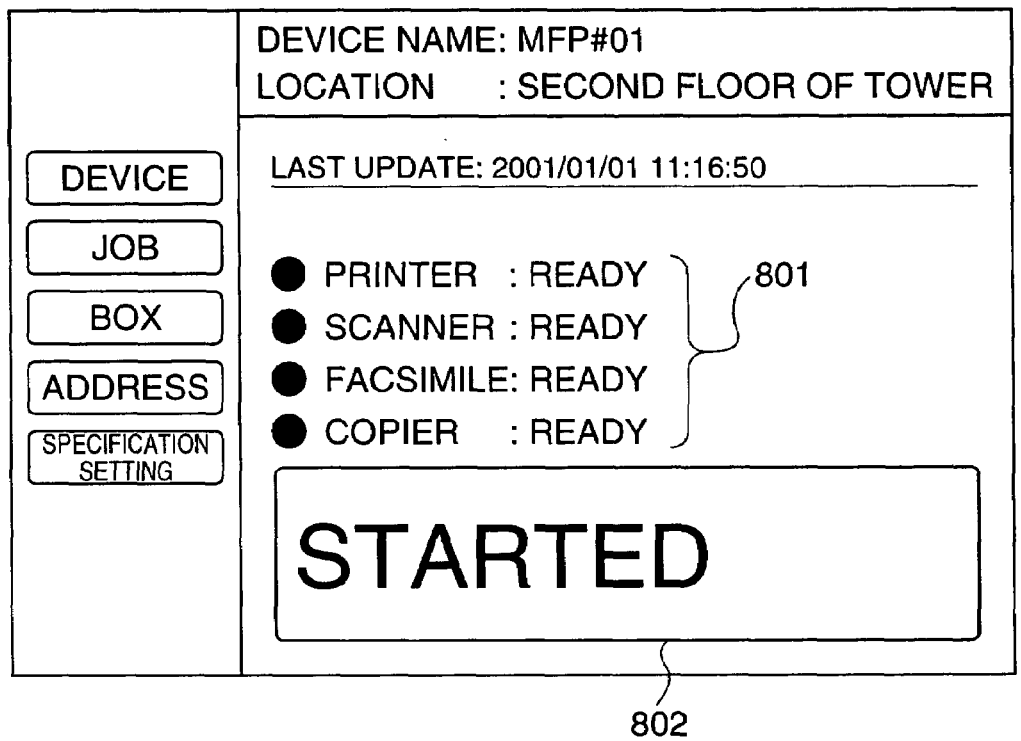
FIG. 9 is a view showing a window screen displayed when all devices have been completely started.

FIG. 8 is a view showing a window screen displayed when the power-on button 603 is selected. The selected power-on button 603 has its character part bold-faced or is indicated in colored characters, whereby the selection thereof is indicated to instruct the MFP 200 to start operation, and whether the MFP 200 has started operation or not is displayed. On this occasion, in the status display section 704, a period of time required to start the MFP 200 is displayed and counted down. For example, to correct for the starting time period varying with the environment where the MFP 200 is installed, the period of time is updated at predetermined time intervals, and the updated period of time is displayed. FIG. 9 is a view showing a window screen displayed when the devices have been completely started. When the devices have been completely started, it is indicated that the devices have been started. In FIG. 9, messages indicating that the devices have been started are displayed as designated by reference numeral 801, and a message "Started" is displayed in a status display section 802.

Figure 10:
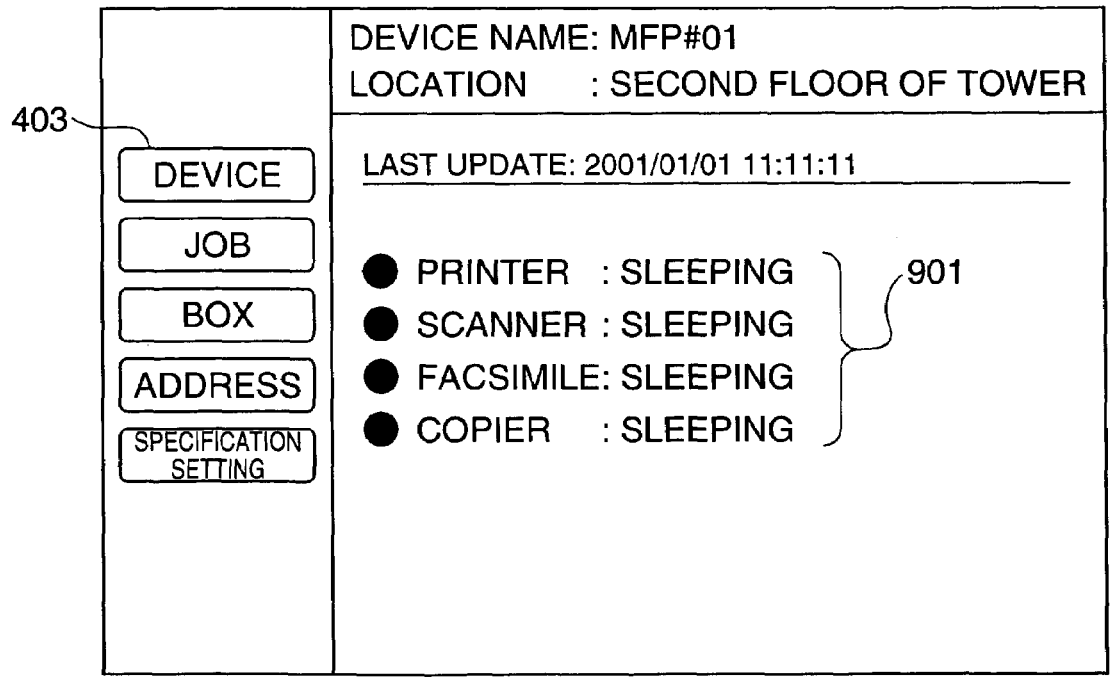
FIG. 10 is a view showing a window screen displayed when the devices are in sleep states.

A description will now be given of how the MFP 200 is started from a sleep state. The status of the MFP 200 in the sleep state can be viewed on the Web. FIG. 10 is a view showing a window screen displayed when the devices are in the sleep state. The sleep state of each device is released in accordance with an instruction given from a terminal apparatus on the Web so that the device can be used.

Figure 11:
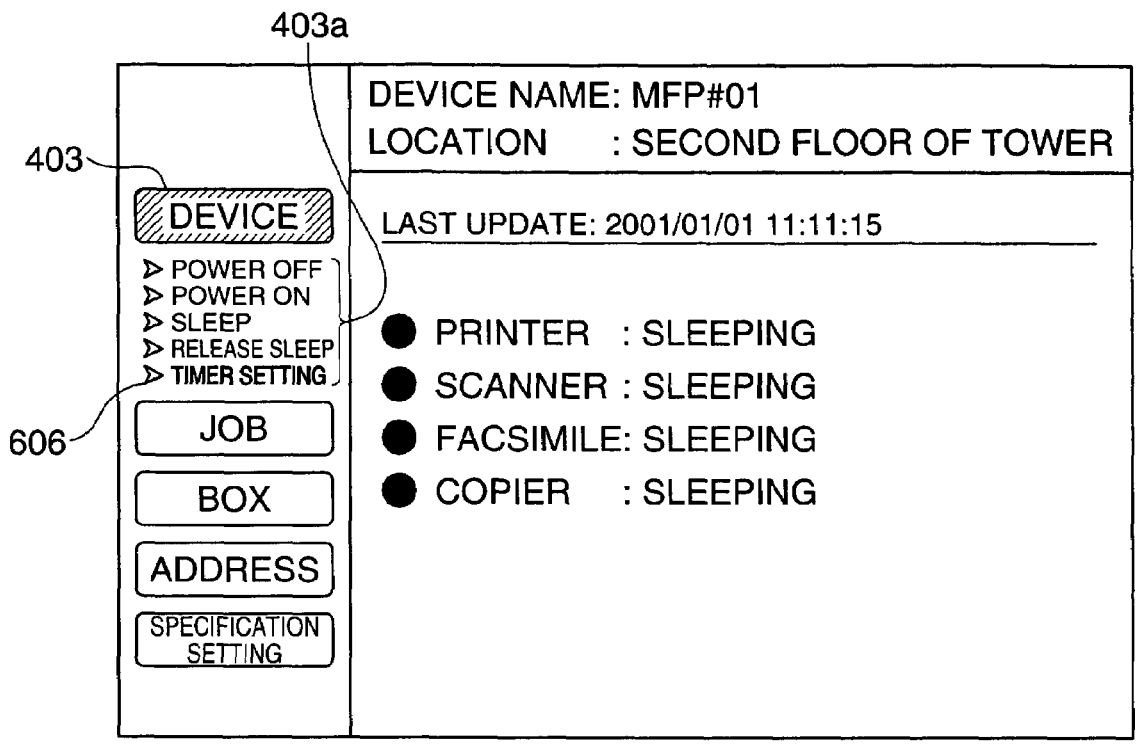
FIG. 11 is a view showing a window screen displayed when the device button 403 is selected.

FIG. 11 is a view showing a window screen displayed when the device button 403 is selected. When the device button 403 is selected, it is highlighted, and a variety of device settings are displayed. To start the sleeping MFP 200, the sleep release button 605 is selected.

Figure 12:
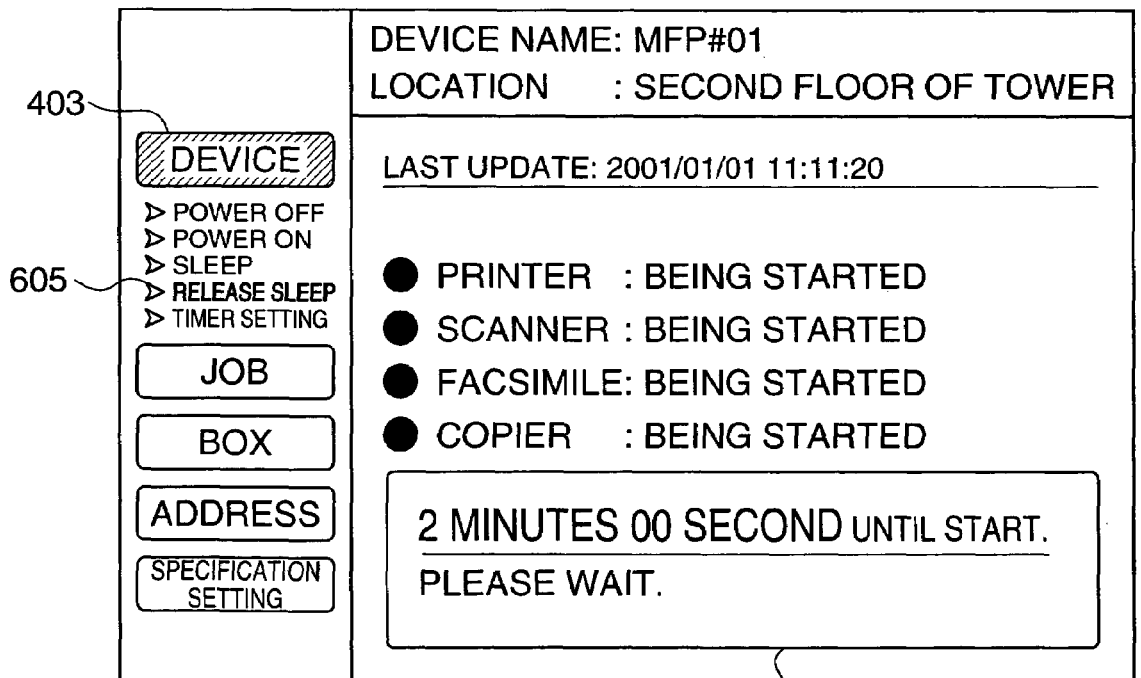
FIG. 12 is a view showing a window screen displayed when a sleep release button 605 is selected.

FIG. 12 is a view showing a window screen displayed when the sleep release button 605 is selected. The selected sleep release button 605 has its character part bold-faced or is indicated in colored characters, whereby the selection of the sleep release button 605 is indicated to instruct the MFP 200 to be released from the sleep state, and whether the MFP 200 has started operation or not is indicated. On this occasion, in a status display section 1104, a starting time period required to start the MFP 200 is displayed and counted down. For example, to correct for the starting time period varying with the environment where the MFP 200 is installed, the starting time period is updated at predetermined time intervals, and the updated period of start-up time is displayed. When the devices have been completely started, the same screen as in FIG. 9 is displayed to indicate that the devices have been started.

As described above, according to the present embodiment, since the turning-on/off of power supply and the setting/release of the sleep state are controlled and the status thereof is displayed via a network and more particularly on the Web, the user can control the MFP even at a remote location. As a result, the devices can be kept off or in the sleep state for a period of time for which power supply is not required, and this contributes to energy-saving. Further, since copying or the like can be performed according to the operative status of the MFP with reference to a period of time displayed on the Web, the user does not have to waste time by standing in front of the MFP until the MFP is started. This is particularly advantageous in the case where the MFP is installed in a large office and at a location remote from the user or on a floor other than the floor where the user is working.

Although in the above described embodiment, it is assumed that the MFP performs digital processing, this is not limitative, but an MFP which performs analog processing may be controlled in a manner similar to that described above insofar as it is equipped with a device controller having a network interface.

A description will now be given of a second embodiment of the present invention with reference to FIGS. 13 to 17 as well as FIGS. 10 to 12, referred to above.

The second embodiment is applied to a remote control system which is capable of performing on/off control of power supply, timer setting for setting/release of the sleep state, and display of the set period of time. The arrangement of the remote control system according to the present embodiment is identical with that of the above described first embodiment, and hence description thereof is omitted. Also, parts and elements corresponding to those of the first embodiment are designated by identical reference numerals, and hence description thereof is omitted.

The operative status of the sleeping MFP 200 can be viewed on the Web as shown in FIG. 10. It is possible to set the timer to release the MFP 200 from the sleep state at a desired time.

When the device button 403 is depressed, it is highlighted, and a sub menu is displayed (refer to FIG. 11). When the timer setting button 606 is selected from the sub menu, it is possible to set time. FIG. 13 is a view showing a window screen displayed when the timer setting button 606 is selected. By selecting a radio button 1503, it is possible to start the MFP at a desired time. In this case, "Time" is set in a time setting section 1504, and "Minute" is set in a minute setting section 1505. Then, when an execution button 1509 is selected to be depressed, data on "Time" set in the time setting section 1504 and data on "Minute" set in the minute setting section 1505 are transmitted to the MFP 200.

The selection of a radio button 1506 specifies how minutes later the MFP 200 will be started. In this case, "Time" is set in a time setting section 1507, and "Minute" is set in a minute setting section 1508. When the execution button 1509 is selected to be depressed, data on "Time" set in the time setting section 1507 and data on "Minute" set in the minute setting section 1508 are transmitted to the MFP 200. When a cancel button 1510 is selected to be depressed, the timer setting is canceled.

Figure 15:
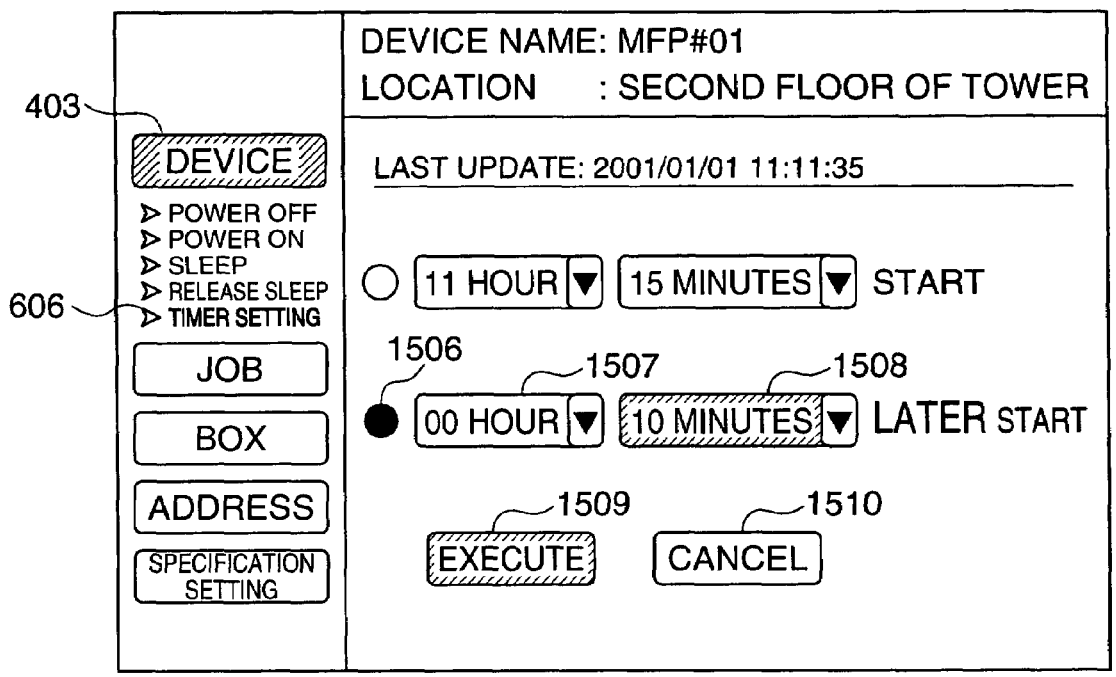
FIG. 15 is a view showing a window screen displayed when a desired period of time is selected from a menu.

How to start the MFP 200 ten minutes later will now be concretely described. FIG. 14 is a view showing a window screen displayed when time is set in the minute setting section 1508. When a "▼" button in the minute setting section 1508 is selected, preset times are indicated as a menu. If a desired time is found in the menu, it is selected. On the other hand, if no desired time is found in the menu, a desired time is input to the minute setting section 1508 from a keyboard. Here, a desired time can be found from the menu, and hence "ten minutes" is selected from the menu. Upon selection of the desired time, the characters representative of the desired time are highlighted, and the radio button 1506 is automatically selected. FIG. 15 is a view showing a window screen displayed when a desired time is selected from the menu.

Figure 17:
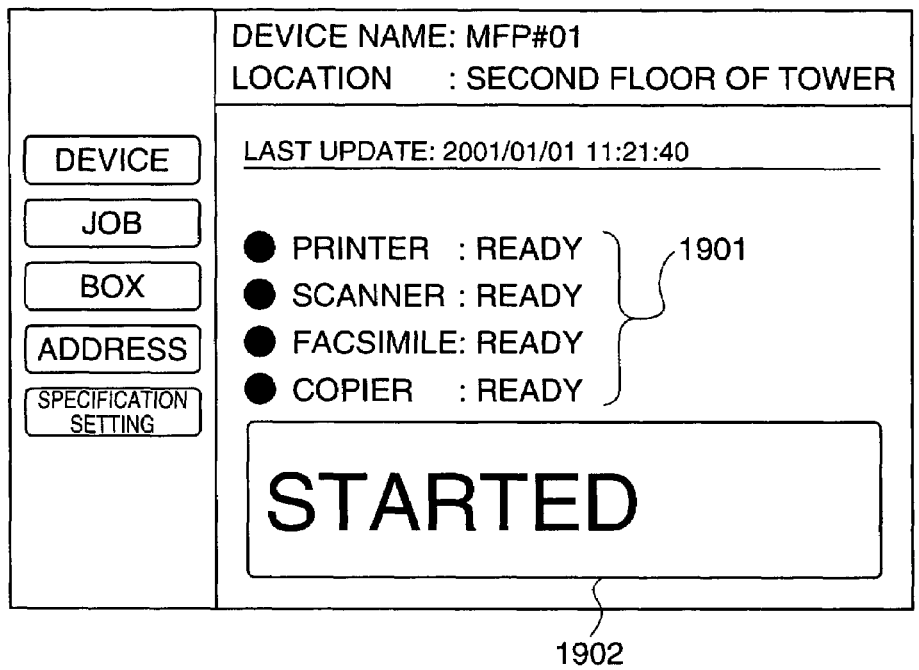
FIG. 17 is a view showing a window screen displayed when all the devices have been completely started.

Then, when the execution button 1509 is depressed, the MFP 200 is instructed to start operation ten minutes later set by the timer, and the operative status of the MFP 200 is displayed. FIG. 16 is a view showing a screen displayed when the execution button 1509 appearing in FIG. 15 is depressed. On this occasion, the time at which the MFP starts operation may be counted down in the user's terminal apparatus (personal computer) or in the MFP 200. When counting is started, a starting time period required to start the MFP 200 is displayed and counted down in a status display section 1804. As the need arises, to correct for the starting time period varying with the environment where the MFP 200 is installed, the starting time period is updated at predetermined time intervals, and the updated starting time period is displayed. When the devices have been completely started, it is indicated that the devices have been started. FIG. 17 is a view showing a window screen displayed when the devices have been completely started. In FIG. 17, messages indicating that the devices have been started are displayed as designated by reference numeral 1901, and a message "Started" is displayed in a status display section 1902.

In setting the starting time period, it is impossible to set a longer period of time than the minimum period of time required for the main body of MFP 200 to sleep. If the user forcibly sets a longer period of time than the minimum period of time, the period of time set by the user is counted down while it is reset to the minimum period of time and displayed in the status display section 1902.

As described above, according to the present embodiment, since the turning-on/off of power supply and the setting/release of the sleep state are controlled and the status thereof is displayed via a network and more particularly on the Web, the user can control the MFP even at a remote location. As a result, the devices can be kept off or in the sleep state for a period of time for power supply is not required, and this contributes to energy-saving. Further, by setting the starting time period by a timer to cause the devices or the MFP 200 to start at a desired time, the user does not have to waste time by standing in front of the MFP until the MFP is started. This is particularly advantageous in the case where the MFP is installed in a large office and at a location remote from the user or on a floor other than the floor where the user is working.

Although in the above described embodiment, it is assumed that the timer is set to start the MFP ten minutes later, this is not limitative, but it is possible to set the timer to start the MFP at a predetermined time. Further, although in the above described embodiment, it is assumed that the devices of the MFP 200, which are sleeping, are started, the devices of the MFP 200, which are powered-off, may be started in a manner similar to that described above. Further, although in the above described embodiment, the MFP performs digital processing, an MFP which performs analog processing may be controlled in a manner similar to that described above insofar as it is equipped with a device controller having a network interface.

Further, although in the above described embodiment, the timer is set to start the powered-off or sleeping MFP, but the timer may be set to power on the MFP in a shut-down state.

A description will now be given of a third embodiment of the present invention with reference to FIGS. 18 to 25.

The third embodiment is applied to a remote control system which is capable of performing on/off control of power supply, and timer setting for setting/release of the sleep state. The arrangement of the remote control system is identical with that of the above described first embodiment, and hence description thereof is omitted. Also, parts and elements corresponding to those of the above described first embodiment are designated by identical reference numerals, and hence description thereof is omitted.

Figure 18:
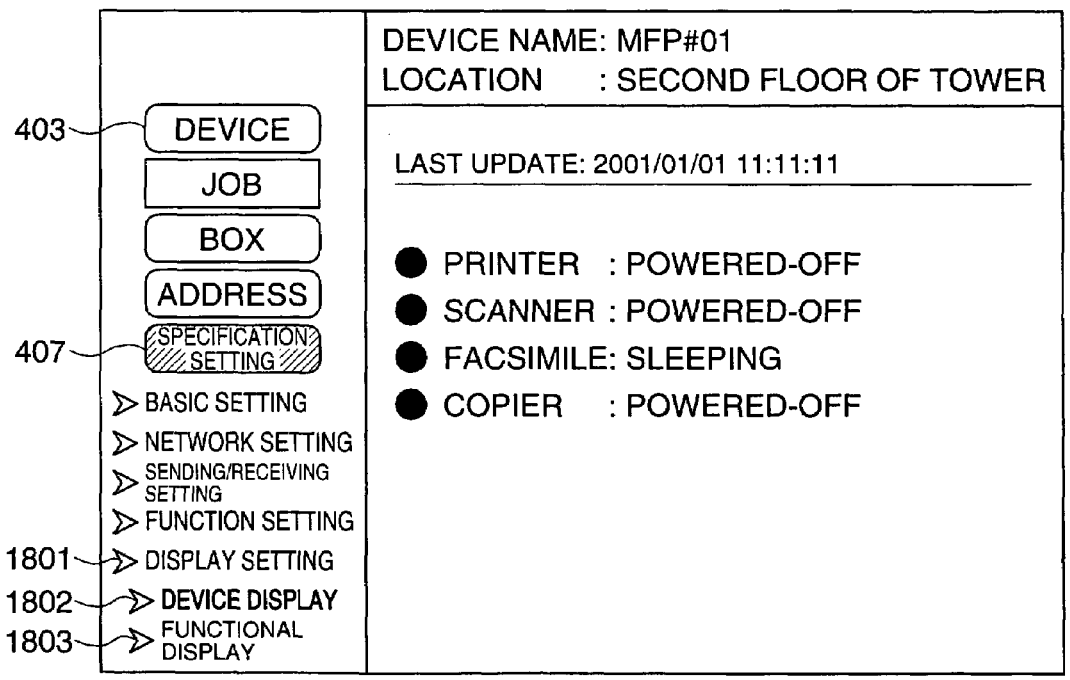
FIG. 18 is a view showing a window screen for changing a display mode.

FIG. 18 is a view showing a window screen displayed for changing the display mode.

When the specification setting button 407 in FIG. 18 is selected, a menu of basic setting, network setting, and so forth is displayed. When display setting 1801 is selected from the menu, a device display button 1802 and a function display button 1803 are displayed. FIG. 18 shows a window screen displayed when the device display button 1802 is selected. In the example of FIG. 18, the device display button 1802 is selected. Here, the selected device display button 1802 is bold-faced, but may be indicated in colored characters or may be highlighted.

Figure 19:
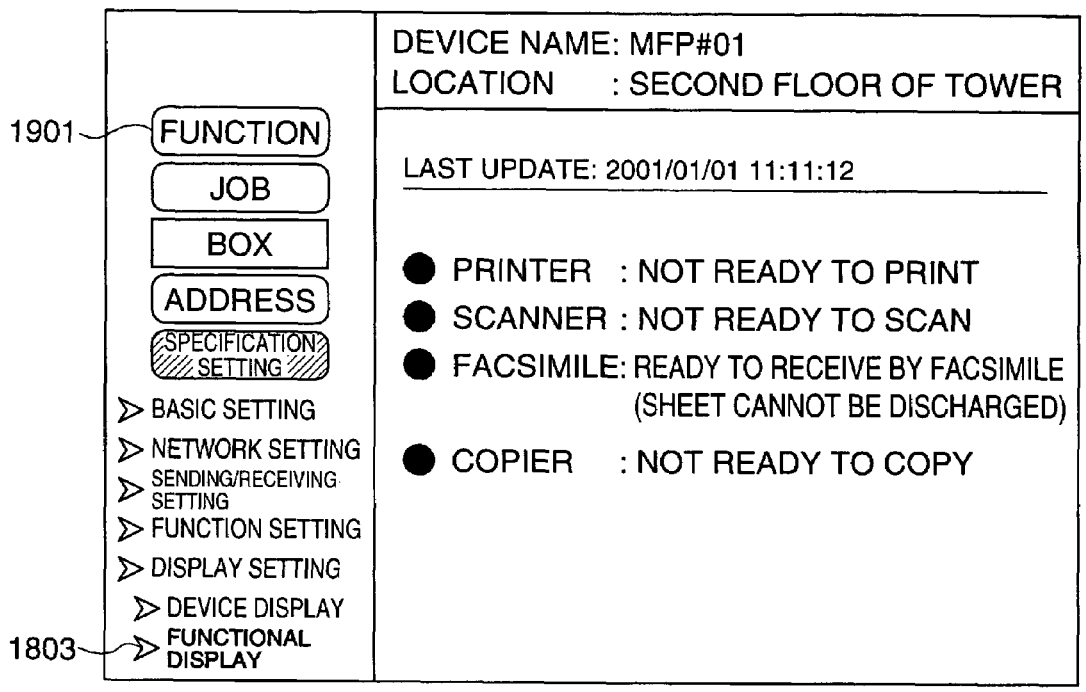
FIG. 19 is a view showing a window screen displayed when a function display button 1803 is selected.

Then, when the function display button 1803 is selected, it becomes bold-faced, and the statuses of the respective functions are displayed as shown in FIG. 19. On this occasion, the device button 403 in FIG. 18 is changed to a function button 1901, and characters indicative of the devices on the window screen are also changed to characters indicative of the functions. In the present embodiment, it is possible to perform power supply control such as turning-on/off of power supply to the devices or causing the devices to sleep by giving instructions directly to the devices, in a manner similar to that described in the above described first or second embodiment. Further, in the present embodiment, it is possible to change the mode to a mode in which the devices are indirectly instructed by specifying functions using a screen in FIGS. 19 to 24, to perform power supply control for respective functions.

Figure 20:
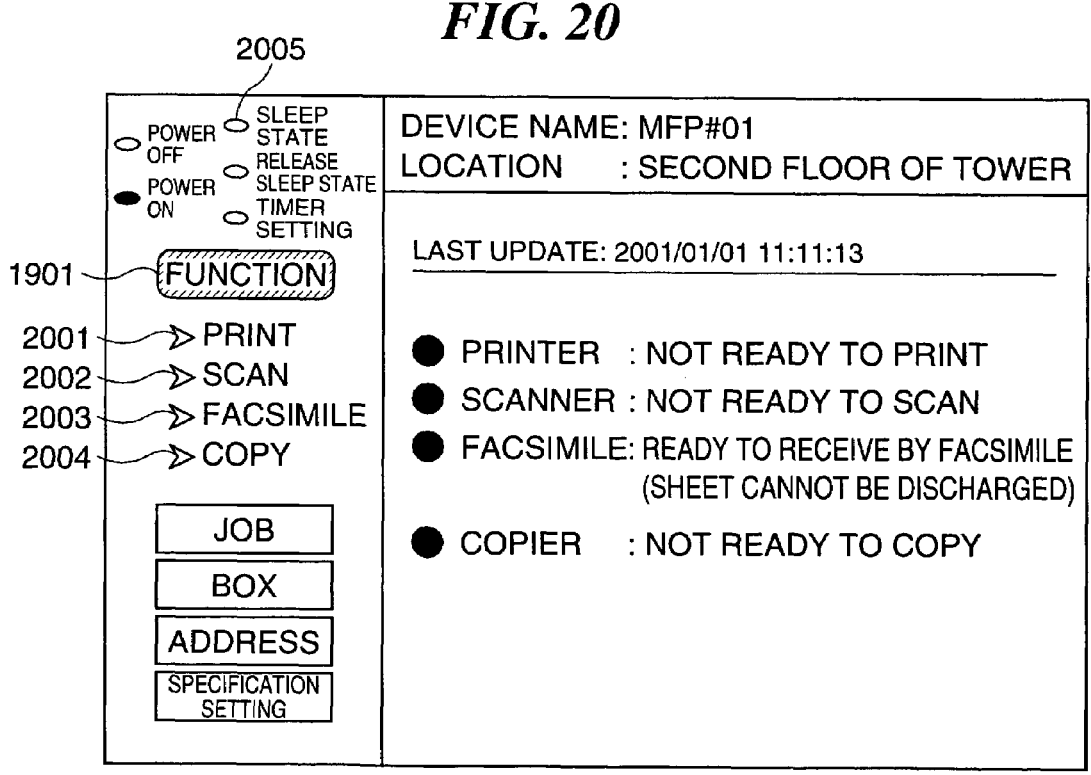
FIG. 20 is a view showing a window screen for controlling power supply for each function.

FIG. 20 is a view showing a window screen for controlling power supply for respective functions.

When the function button 1901 is selected, a printing function button 2002, a scanning function button 2002, a facsimile function button 2003, a copying function button 2004, and power supply control types 2005 are displayed. The statuses of the respective functions are displayed on the window screen. The statuses may include not only the status of power but also error information and information indicative of residual amounts of supplies such as sheets/toners so that various information indicative of statuses can be sent from the MFP 200 to the terminal apparatus via the LAN 121. The power supply control types 2005 include control setting items such as turning-off of power, turning-on of power, sleep state, release of sleep state, and timer setting.

Figure 25:
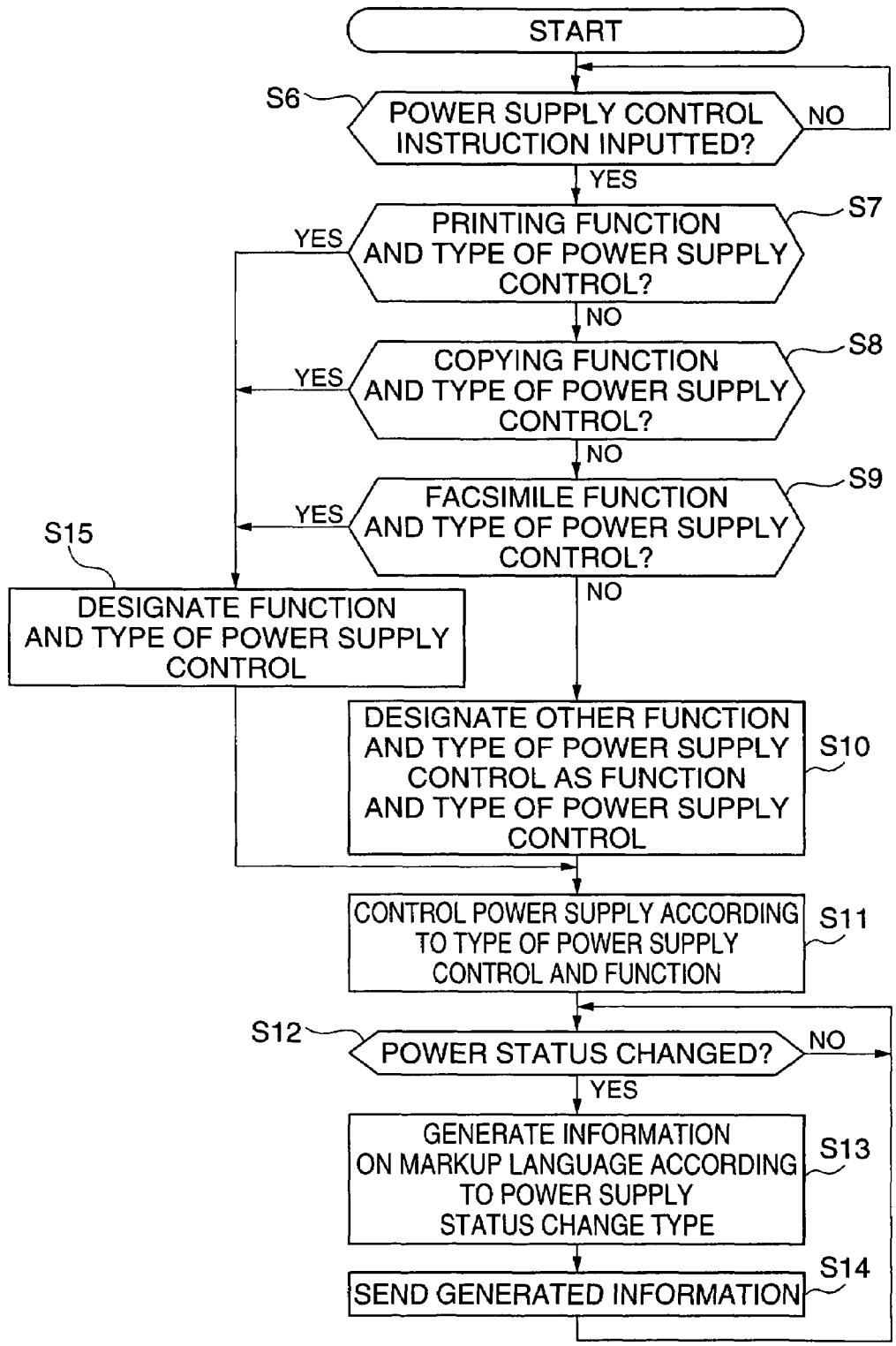
FIG. 25 is a flow chart showing the procedure of a power supply control process carried out by the MFP 200 as a Web server according to a third embodiment of the present invention.

FIG. 25 is a flow chart showing the procedure of a power supply control process carried out by the MFP 200 as a Web server. It should be noted that respective steps in the FIG. 25 flow chart are executed by the CPU 207 in accordance with a program stored in the memory 205 or the hard disk 206.

First, in the case where the user wants to use the printing function, if a message "Not ready to print" is displayed on a window screen of the terminal apparatus, the user selects the turning-on of power from among the power supply control types 2005, and at the same time selects the printing function button 2001. When an instruction to select the printing function button 2001 in FIG. 20 is input to the terminal apparatus, the terminal apparatus (the personal computer 112 in FIG. 1) sends a command indicative of the input instruction to the MFP 200 via the LAN 121 (step S6).

In the following description, it is assumed that power supply to the MFP 200 is turned on (started), but in the case where the turning-off of power or the sleep state is selected from among the power supply control types 2005, a power supply control instruction including information on the designated type of power supply control and information on the designated function of the MFP 200 is transmitted from the terminal apparatus to the MFP 200 as in the case where the turning-on of power supply is selected. In the MFP 200 having received the power supply control instruction, power supply is controlled based on the information indicative of the type (2005) of power supply control and the information indicative of the function (one of the types 2001 to 2004) included in the power supply control instruction.

Figure 21:
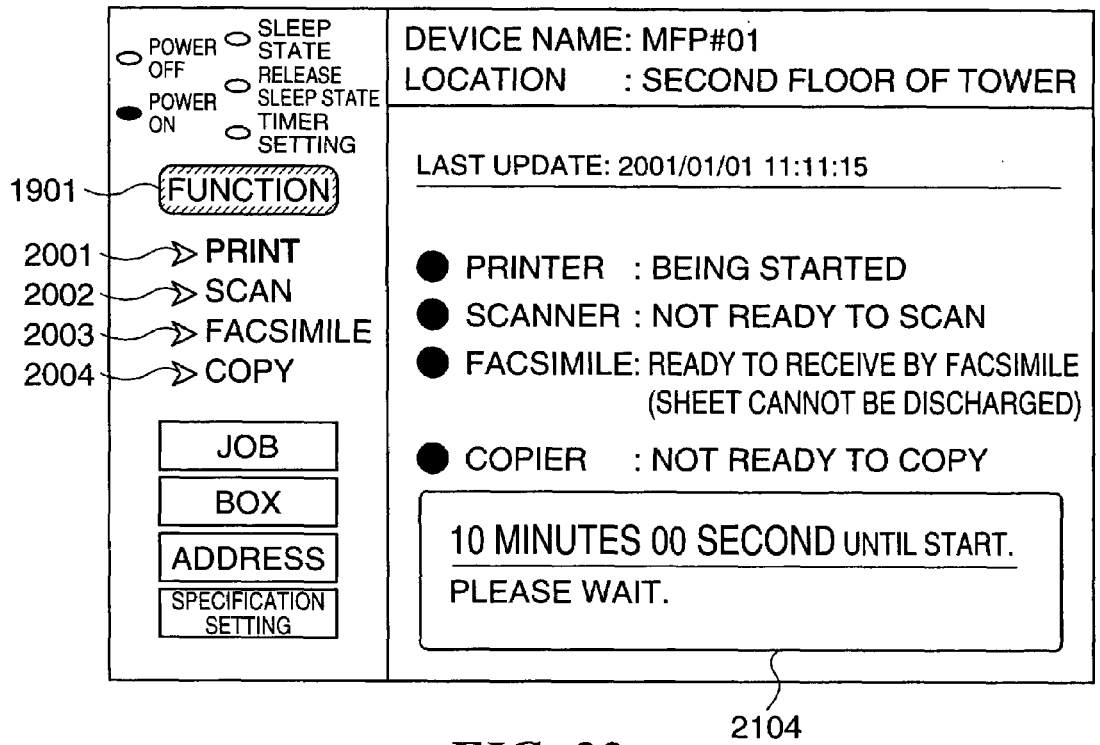
FIG. 21 is a view showing a window screen displayed in response to an instruction for controlling power supply for a printing function.

FIG. 21 is a view showing a window screen displayed when an instruction is given for power supply for the printing function. As shown in FIG. 21, the selected printing function button 2001 is bold-faced, and in a status display section 2104, a period of time required to activate the printing function is displayed and counted down.

On this occasion, the CPU 207 recognizes the information indicative of the type and function of power supply control instructed to be carried out (steps S7 to S9) to designate the type and function of power supply control (steps S15 and S10). Then, the CPU 207 instructs the power supply section 210 to control power supply in accordance with the designated type and function of power supply control (step S11). In this case, each device required for printing is powered on (energized) (step S7 ("YES"), S15, and S11).

Since the printing function is designated here, the printer 203, device controller 204, memory 205, and hard disk 206, which are required for printing, are energized. On the other hand, devices such as the scanner 202, operating section 201, and facsimile section 209, which are not required for printing, are not energized.

Then, the CPU 207 determines whether the power statuses of the devices have changed or not (step S12). In this case, it is determined whether the devices required for printing have come into a standby state or not. This determination is made by the determining whether, for example, a predetermined period of time (i.e. a period of time required to bring the devices into the standby state) has elapsed or not after the power supply section 210 is instructed to supply power.

When the devices required for printing have come into the standby state, the MFP 200 generates information indicating that the devices required for the printing function designated from the terminal apparatus have come into the standby state (step S13), and sends the generated information to the terminal apparatus (step S14).

Figure 22:
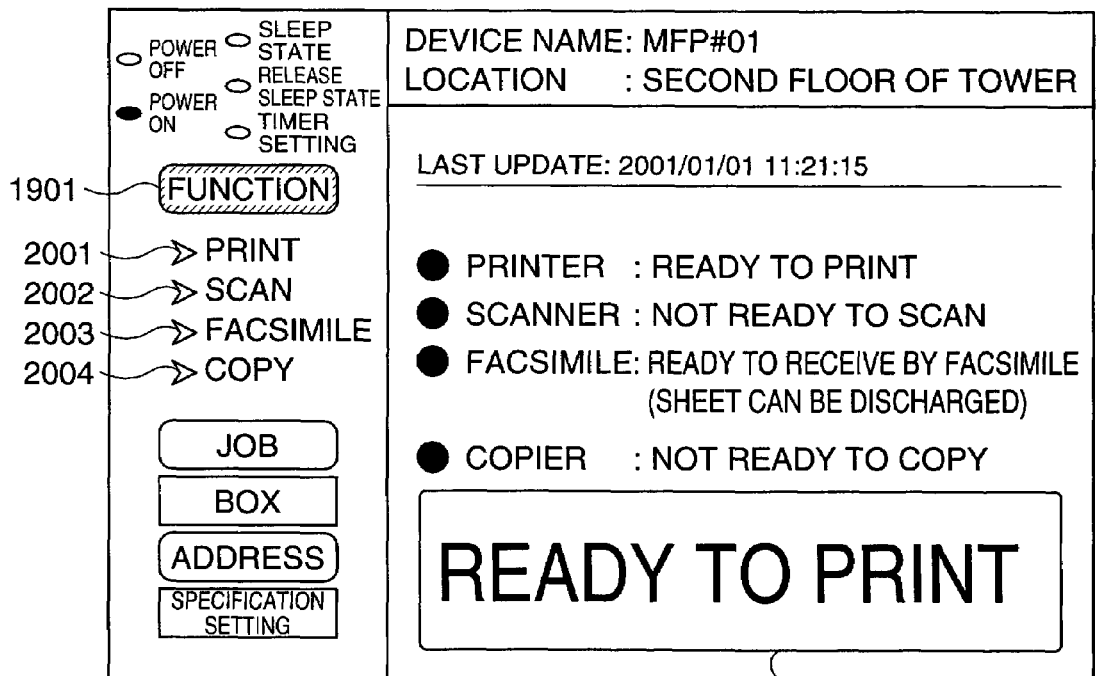

Then, upon receipt of the communication information from the MFP 200, the terminal apparatus displays a message "Ready to print" in a status display section 2204 as shown in FIG. 22.

Although in the above described steps S12 to S14, when the devices have come into the standby state, information to this effect is sent to the terminal apparatus, this is not limitative, but it may be configured such that out of a plurality of types of changes, a type of change in power status is detected by the CPU 207 (step S12), a markup language is generated based on the detected type of change in power status (step S13), and information indicative of the generated language is sent to the terminal apparatus (step S14). Further, the message "Ready to print" may be displayed not only on the screen of the terminal apparatus but also on the operating section 201 of the MFP 200.

In this way, the power statuses of the respective functions of the MFP 200 are displayed on the screen of the terminal apparatus and the operating section 201 of the MFP 200 according to the user's selected types and functions of power supply control, so that the user can know whether his/her desired function can be executed or not. It should be noted that in the case where a function other than the printing function is selected, the same process (steps S12 to S14) is carried out.

Further, when the user wants to make a copy, the copying function button 2004 of the function button 1901 is selected. When an instruction for selecting the copying function button 2004 in FIG. 23 is input to the terminal apparatus, the terminal apparatus (the personal computer 112 in FIG. 1) transmits a command indicative of the instruction to the MFP 200 via the LAN 121.

Then, it is determined whether a power supply control instruction is input from the terminal apparatus or not (step S6), and if the power supply control instruction is input from the terminal apparatus, the CPU 207 determines the input type and function of power supply control instructed to be carried out (steps S7 to S10), and starts the devices required for copying such that they automatically come into the standby state (step S8 ("YES"), S15, and S11). Since the copying function is designated here, the operating section 201, scanner 202, printer 203, device controller 204, memory 205, and hard disk 206, which are required for copying, are energized. On the other hand, devices such as the facsimile 209, which are not required for printing, are not energized.

Figure 23:
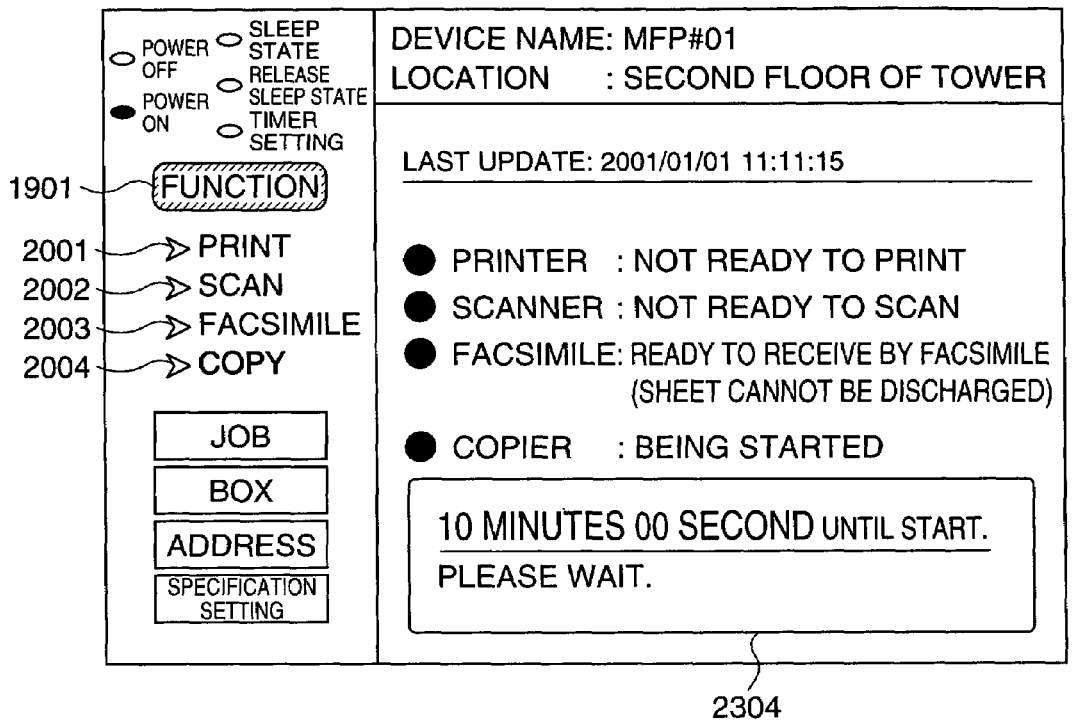
FIG. 23 is a view showing a window screen displayed in response to an instruction for controlling power supply for a copying function.

At the same time, as shown in FIG. 23, the selected copying button 2004 is bold-faced, and in a status display section 2304, a period of time required to activate to activate the printing function is displayed and counted down.

Figure 24:
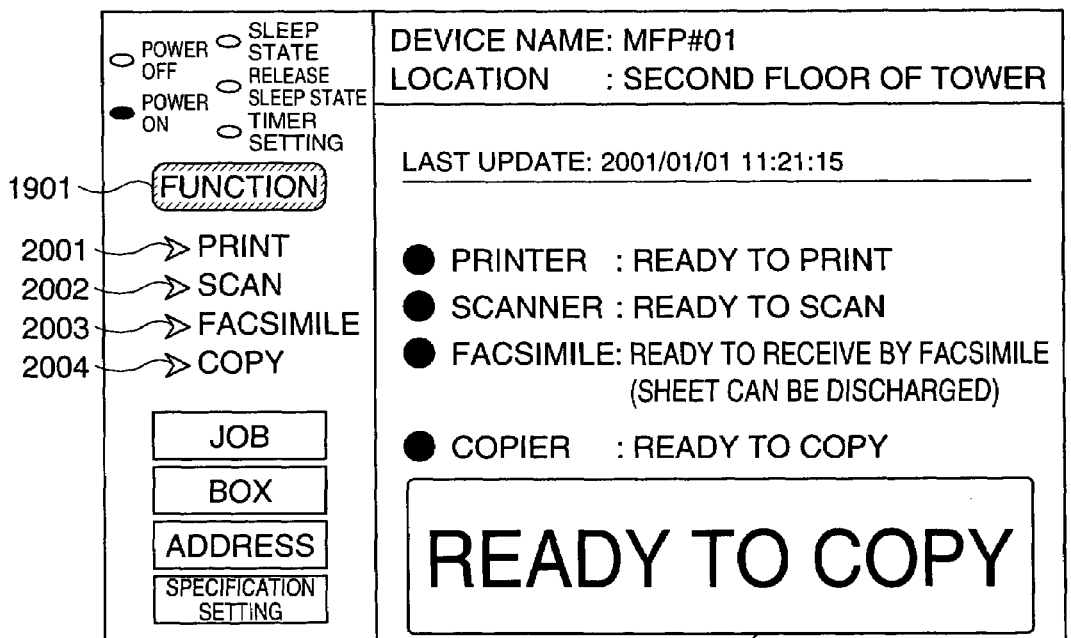

When the devices required for the copying function designated from the terminal apparatus have come into the standby state ("YES" to the step S12), the CPU 207 generates information indicating that the devices required for the copying function designated from the terminal apparatus have come into the standby state (step S13), and sends the generated information to the terminal apparatus (step S14). When the devices required for the copying function have been powered on, a message "Ready to print" is displayed in a status display section 2404 as shown in FIG. 24. Since the copying function is realized by a combination of the scanning function and the printing function, it is indicated that both the scanning function and the printing function can be used.

As described above, according to the present embodiment, since the activation of functions is controlled and the statuses thereof are displayed via a network and more particularly on the Web, the user can control the MFP not only in the Intranet environment but also at a remote location. As a result, the devices can be kept off or in the sleep state for a period of time for which power supply is not required, and this contributes to energy-saving. Further, since copying or the like can be performed according to the operative status of the MFP with reference to a period of time displayed on the Web, the user does not have to waste time by standing in front of the MFP until the MFP is started. This is particularly advantageous in the case where the MFP is installed in a large office and at a location remote from the user or on a floor other than the floor where the user is working. Further, since the functions are displayed and controlled independently of each other, the user can supply power only for his/her desired function without hesitation and does not have to carry out such a complicated operation in which devices corresponding to the his/her desired function are determined by the user himself/herself, designated and brought into the ON/OFF/sleep state.

Although in the present embodiment, it is assumed that the MFP has the printing function, scanning function, facsimile function, and copying function, this is not limitative, but the MFP may have a variety of functions such as a box job function of storing print data in the hard disk of the MFP through the terminal apparatus.

A description will now be given of a fourth embodiment of the present invention.

In the fourth embodiment, instructions for controlling power supply are given from the terminal apparatus (client) capable of communicating with the MFP 200 via the LAN 121, but the window screens shown in FIGS. 5 to 24 may be displayed on the operating section 201 (display operating section) of the main body of the MFP 200 so that instructions for controlling power supply can be given from the operating section 201 of the main body of the MFP 200. The window screens are changed in the same manner as described with reference to FIGS. 5 to 24.

In this way, according to the present embodiment, the user can control power supply for devices required for his/her desired function by operating the operating section 201 of the MFP 200.

It should be noted that as the power supply control, various kinds of power supply control are assumed such as turning-on/off of power supply and setting/release of the sleep state as shown in FIG. 7 and other figures, and as the sleep state, for example, sleep states of multiple levels such as a deep mode (in which power consumption is very low, but it takes a long time for the MFP to return to the standby state) and a shallow mode (in which power consumption is high, but it takes only a short time for the MFP to return to the standby state) are provided and displayed on a window screen to provide a more detailed power supply control environment for the user. Thus, the fourth embodiment enables power supply control according to the first through third embodiments to be applied not only to a system composed of terminal apparatuses and the MFP 200 but also to a single image processing apparatus. Further, the processes carried out by the terminal apparatus and the MFP 200 according to the above described first through fourth embodiments may be realized by carrying out communication between the terminal apparatus and the MFP 200 via the server (109 or 100).

It should be understood that the present invention is not limited to the embodiments described above, but various variations of the above described embodiments may be possible without departing from the spirits of the present invention.

Further, the present invention may either be applied to a single apparatus or to a system composed of a plurality of apparatuses (for example, a host computer, an interface, a reader, and a printer).

It is to be understood that the object of the present invention may also be accomplished by supplying a system or an apparatus with a storage medium in which a program code of software, as shown in FIGS. 4 and 25 which realizes the functions of any of the embodiments described above is stored, and causing a computer (or CPU or MPU) of the system or apparatus to read out and execute the program code stored in the storage medium.

In this case, the program code itself read from the storage medium realizes the functions of any of the embodiments described above, and hence the storage medium on which the program code is stored constitutes the present invention.

Further, it is to be understood that the functions of any of the embodiments described above may be accomplished not only by executing a program code read out by a computer, but also by causing an OS (operating system) or the like which operates on the computer to perform a part or all of the actual operations based on instructions of the program code.

Further, it is to be understood that the functions of any of the embodiments described above may be accomplished by writing a program code read out from the storage medium into a memory provided on an expansion board inserted into a computer or in an expansion unit connected to the computer and then causing a CPU or the like provided in the expansion board or the expansion unit to perform a part or all of the actual operations based on instructions of the program code.

In addition, as long as the functions of the above-mentioned embodiments are realized on a computer, the form of the program may be an object code, a program executed by an interpreter, or a script data supplied for an OS.

Examples of the storage medium for supplying the program code include a floppy (registered trademark) disk, a hard disk, an optical disk, a magnetic-optical disk, a CD-ROM, a CD-R, a CD-RW, DVD-ROM, a DVD-RAM, a DVD-RW, a DVD+RW, a magnetic tape, a nonvolatile memory card, and a ROM. Alternatively, the program may be downloaded from another computer or a database, not shown, connected to a network such as the Internet, a commercial network, or a local area network.

What is claimed is:

1. An information processing apparatus having a plurality of functions and connected with an external apparatus having a display unit via a network, the information processing apparatus comprising:
    a generating unit that generates a file including first information that causes the display unit to display a status screen for displaying power supply status of the plurality of functions and second information that causes the display unit to display a setting screen for setting at least power supply status of the plurality of functions;
    a communication control unit that transmits the file generated by said generating unit to the external apparatus and that receives function information from the external apparatus indicating at least one function selected from the plurality of functions via the setting screen displayed by the display unit based on the second information;
    a power supply unit that supplies power to devices that compose the information processing apparatus; and
    a power supply control unit that controls the power status of the power supply unit relating to at least one of the devices required for the at least one function indicated by the function information, according to the reception of the function information from the external apparatus.

2. An information processing apparatus according to claim 1, wherein:
    said second information causes the display unit to display types of power supply status corresponding to the at least one function on the setting screen in a manner being selectable;
    said communication unit receives type information indicating the types of power supply status relating to the at least one selected function; and
    said power supply control unit controls the power supply status of the power supply unit relating to the at least one of the devices required for the at least one function indicated by the function information based on the type information.

3. An information processing apparatus according to claim 1, wherein the information processing apparatus is an image processing apparatus having an image forming unit for forming an image.

4. An information processing apparatus according to claim 1, wherein the plurality of functions comprise at least two functions selected from the group consisting of a printing function, a facsimile function, a copying function, and a scanner function.

5. An information processing apparatus according to claim 1, wherein said generating unit generates the file in response to a request to view the file to be generated made by the external apparatus.

6. An information processing apparatus according to claim 1, wherein the file is written in a markup language, and the external apparatus includes a browsing unit for browsing the file on the display unit.

7. A power supply control method for an information processing apparatus having a plurality of functions and connected with an external apparatus having a display unit via a network, the method comprising the steps of:

generating a file including first information that causes the display unit to display a power status screen for displaying power supply status of the plurality of functions and second information that causes the display unit to display a setting screen for setting at least power supply status of the plurality of functions;

transmitting the file generated by the generating step to the external apparatus;

receiving function information indicating at least one function selected from the plurality of functions via the setting screen displayed by the display unit; and controlling the power supply status of a power supply unit that supplies power to devices that compose the information processing apparatus relating to at least one of the devices required for the at least one function indicated by the function information, according to the reception of the function information from the external apparatus.

8. A power supply control method according to claim 7, wherein:

said second information causes the display unit to display types of power supply status corresponding to the at least one function on the setting screen in a manner being selectable;

type information indicating the types of power supply status relating to the at least one function received; and said power supply control step comprises controlling the power supply status of the power supply unit relating to the at least one of the devices required for the at least one function indicated by the function information based on the type information.

9. A power supply control method according to claim 7, wherein the information processing apparatus is an image processing apparatus having an image forming unit for forming an image.

10. A power supply control method according to claim 7, wherein the plurality of functions comprise at least two functions selected from the group consisting of a printing function, a facsimile function, a copying function, and a scanner function.

* * * * *